UNITED STATES PATENT OFFICE.

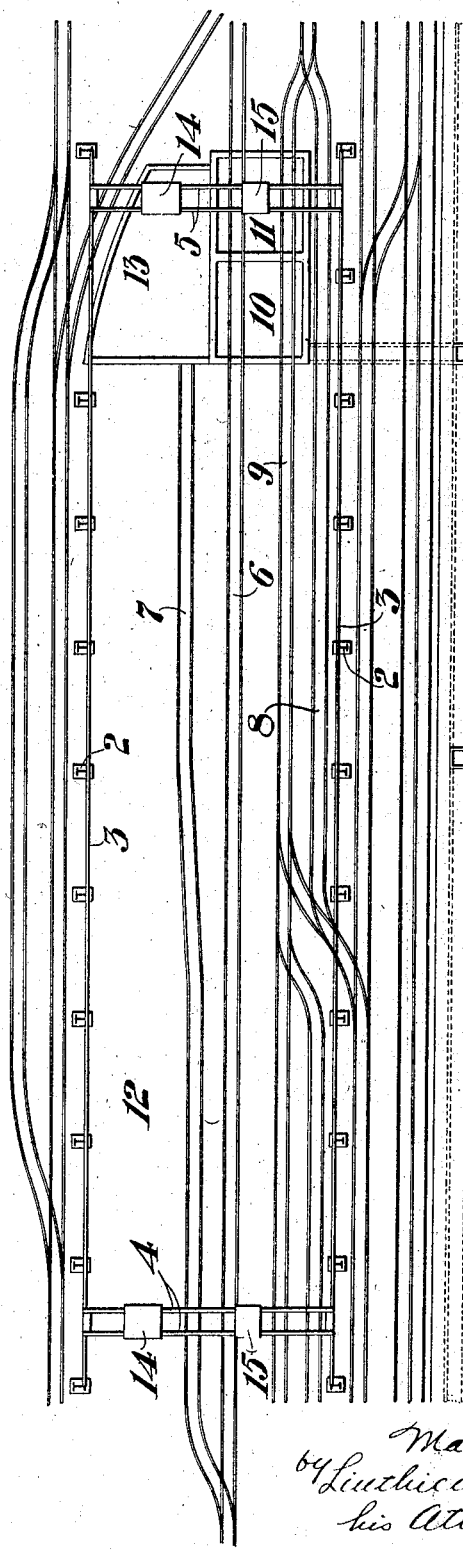

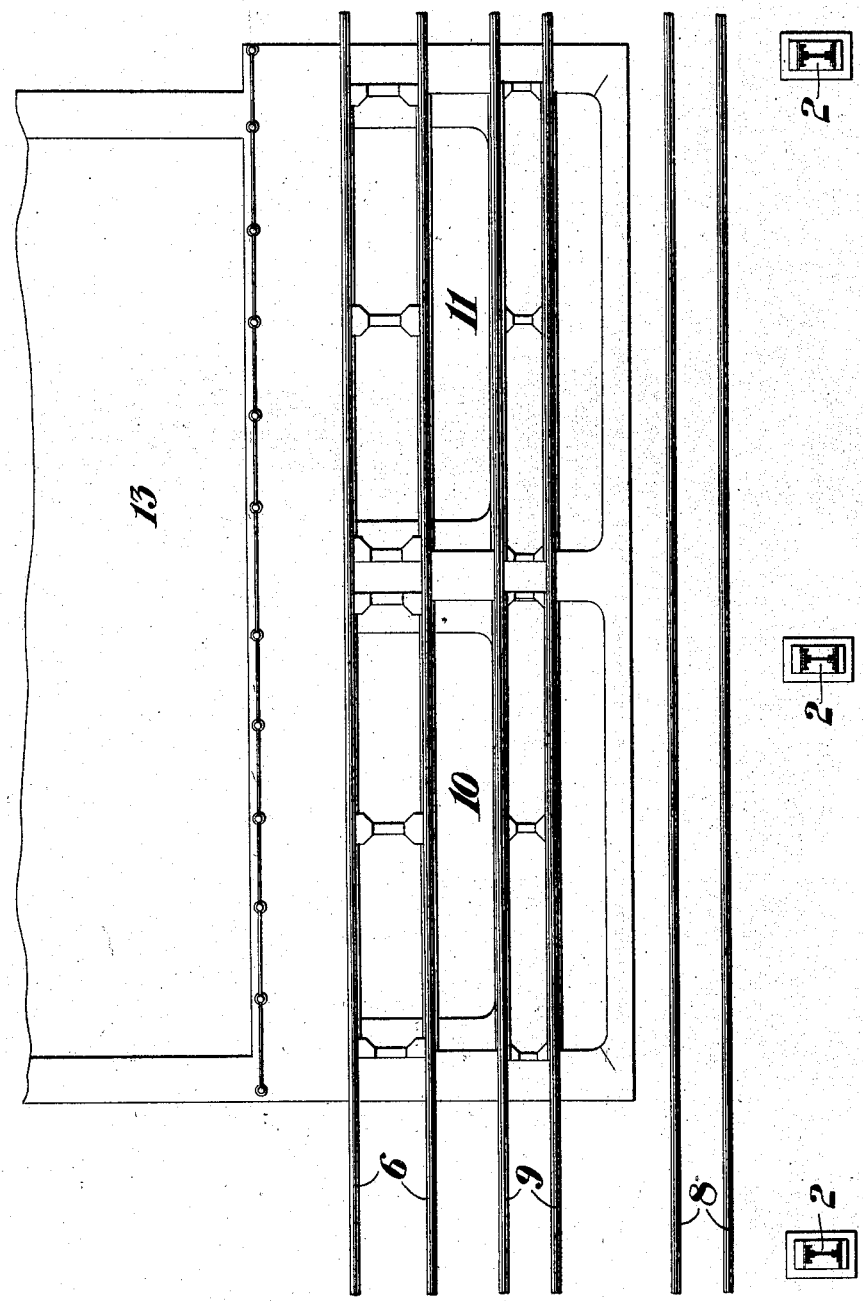

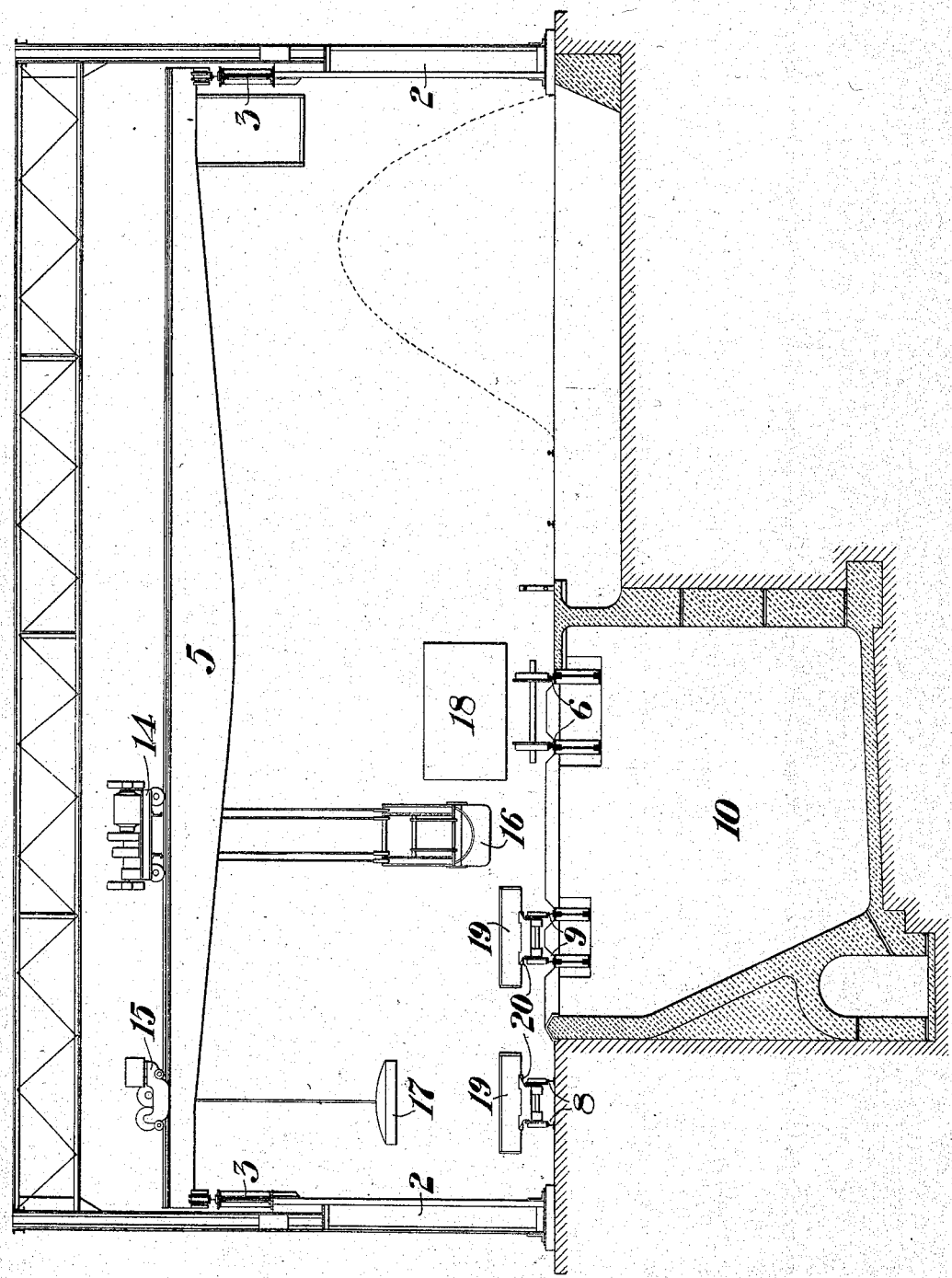

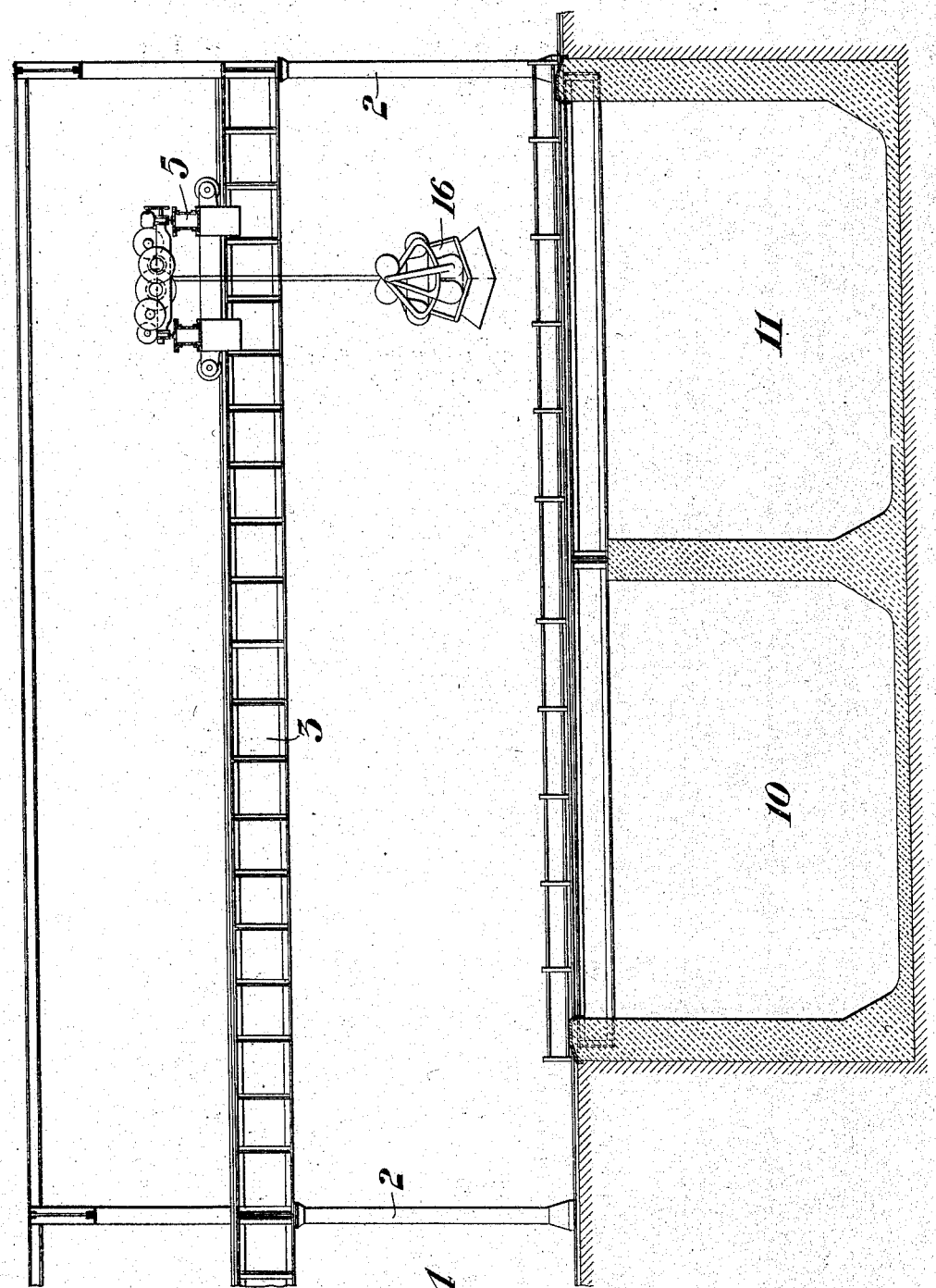

MAX M. SUPPES, OF ELYRIA, OHIO.

STOCK-HANDLING AND STOCK-STORAGE YARD AND EQUIPMENT.

999,904.  Specification of Letters Patent.  Patented Aug. 8, 1911.

Application filed November 15, 1910. Serial No. 592,511.

*To all whom it may concern:*

Be it known that I, MAX M. SUPPES, of Elyria, in the county of Lorain and State of Ohio, have invented certain new and useful Improvements in Stock-Handling and Stock-Storage Yards and Equipment, of which the following is a full, clear, and exact description, reference being had to the accompanying drawings, forming part of this specification.

My invention relates to both the storing and handling of the raw materials used in making iron, steel, and similar materials, and to the apparatus by which such materials are unloaded from the cars to the stock pile of a storage yard and are later transferred from the stock pile to the cars or other carriers in which the materials are loaded to be transferred to the furnaces of an open hearth plant or other place of use.

In handling the raw materials used in the manufacture of iron and steel, a large part of the materials is unavoidably spilled during the transferring operations. Heretofore, such spilled materials become scattered upon and around the unloading tracks to such an extent as to seriously interfere with the shifting operations necessary in placing and removing the cars which are constantly being loaded and unloaded. The collection and removal of the spilled materials, which when dropped become scattered over a considerable area during the loading and unloading operations as heretofore carried out, is the cause of frequent delays in the operations of loading and unloading and the source of considerable expense.

One object of my invention is to provide a stock handling and stock storage yard constructed and arranged to store a maximum amount of materials within a minimum space or area compassed by the rectangle comprising the operative range of the overhead traveling cranes forming part of the storage yard equipment.

Another object of this invention is to provide a storage yard having novel means for assembling and handling the materials spilled or dropped in unloading from and reloading into the cars or other carriers in which such materials are handled or transferred to the storage yard and from the storage yard to a place of use.

A further object of the invention is to provide a storage yard equipped with stock handling apparatus having novel means for handling and re-handling materials stored in such yards.

A still further object of my invention is to provide a storage yard having an improved arrangement of tracks, pits, and cranes, whereby the materials are placed or stored so as to be more readily accessible in being unloaded, stored, and in being reloaded and transferred to a place of use with a minimum amount of labor and at a greatly reduced cost, as is more fully described and pointed out hereinafter.

Referring to the drawings, Figure 1 is a plan showing one arrangement of a storage yard, crane runway, car tracks and pits, constructed and arranged in accordance with my invention. Fig. 2 is a plan on a larger scale showing my improved arrangement of loading tracks and pits, as located within the rectangle formed by the crane runway. Fig. 3 is a sectional end elevation of the storage yard and yard equipment illustrated in Figs. 1 and 2. Fig. 4 is a sectional side elevation of the same.

In the accompanying drawings, 2 designates the columns supporting the girders 3 of a crane runway. Mounted on the crane runway are traveling cranes 4 and 5 arranged, as shown, to span a storage yard equipped with standard gage tracks 6 and 7, and narrow gage tracks 8 and 9, the track 6 and narrow gage track 9 being arranged so as to extend over loading pits 10 and 11, for a purpose described hereinafter. Spaces 12 and 13 are provided within the storage yard, which are used to store the large quantity of the materials usually stocked in the yard.

The narrow gage tracks 8 and 9 are connected together by suitable switches so as to afford switching facilities for the narrow gage cars or other carriers employed, and the broad gage tracks 6 and 7 also are connected together (as shown, at a point without the storage yard) by switches, in order to transfer the broad gage cars from one track to another.

Each of the cranes 4 and 5 is provided with a plurality of trolleys 14 and 15, the trolleys 14 having suspended therefrom a grab bucket 16, which may be of the clam shell, the orange peel, or other desired type, adapted for use in handling the class of materials stored in the storage yard. The trolleys 15 are provided with a lifting magnet 17 by which the metal portions of the stock stored in the storage yard are handled and are separated from the non-metallic materials.

Located at a suitable point within the rectangle formed by the crane runways are pits 10 and 11, provided to receive and collect the materials unavoidably dropped or spilled by the unloading devices suspended from the crane trolleys, in removing materials from the cars and in re-loading the materials from the stock pile into the cars or other carriers by which the materials are conveyed to a place of use.

In the operation of the apparatus shown in the drawings, which is constructed and arranged and adapted for use in handling and storing the materials used in making steel in an open hearth plant, the raw materials are received in cars 18, which, when to be unloaded are shifted into position above one or the other of the pits 10 and 11. A grab bucket 16 suspended from a trolley 14 on one or the other of the traveling cranes 4 and 5, is used to unload the non-magnetic materials, such as ore, limestone, dolomite, and other refractories used in the operation of open hearth plants, and, preferably, a lifting magnet 17, suspended from an auxiliary trolley 15 on the same crane, is employed to unload the metallic or magnetic materials used in such open hearth plants, such as mill scrap, pig iron, and similar materials. In unloading the broad gage cars 18 the materials are either transferred direct to charging boxes 19 on the narrow gage cars 20, which in such case are located on the track 9 above the pits 10 and 11 to be loaded, or the materials may be unloaded from the cars 18 and stored for future use in the stock pile or piles maintained in the storage yard. When materials are being loaded into the charging boxes 19 from the stock pile, the narrow gage cars supporting the boxes 19 are also placed on the track 9 in position above the loading pits 10 and 11. In loading materials into and taking materials out of the cars and in filling the charging boxes or other carriers, while the cars or carriers are located above the loading pits, any materials dropped or spilled by the grab bucket or by the magnet falls into one of the pits 10 or 11, and by reason of the sloping or inclined construction of the side walls of these pits, such materials are directed and delivered to a suitable point in the pit in position to be again picked up and hoisted out of the pit by the grab bucket or lifting magnet and be deposited in the car or charging bucket.

The advantages of my invention will be apparent to those skilled in the art. By the arrangement of the crane runway, the cranes having each a plurality of trolleys, a maximum amount of materials can be handled and stored within a minimum space or area.

In unloading and loading the large number of cars necessary to maintain an open hearth plant in operation, a large amount of the materials handled is spilled by the grab buckets or by the magnet and by causing the spilled materials to fall or drop into the unloading pits, the necessity for collecting and removing the spilled materials from the car tracks and from around the tracks so as to avoid clogging of these tracks and interference with the operation of shifting the cars, the loading and unloading operations are greatly facilitated.

The provision of a trolley on each crane having a lifting magnet and second independently operated trolley having a grab bucket operatively secured thereto, and by locating the crane operating mechanism and the trolley operating mechanisms where they can be manipulated by a single operator, delays in the operation of the cranes necessitated heretofore in order to remove the grab bucket and attach the lifting magnet to the crane, and vice-versa, are avoided, and rendered unnecessary.

By locating the cars or other carriers above the pit while being filled or emptied, the spilled materials do not drop upon the track, and, instead of becoming scattered over a comparatively large space or area about the loading and unloading tracks, the spilled materials are caused to collect and be assembled within the pit into position to be quickly removed by the grab bucket or lifting magnet. The magnetic or metallic materials are readily separated from the non-magnetic materials by employing the lifting magnet to remove them from the collection of spilled materials in the pit and after the magnetic materials have been separated from the other materials collected in the pit, the non-magnetic materials can then be removed by means of the grab bucket or when desired the grab bucket may be employed to remove the mixture of metallic and non-metallic materials.

Modifications in the construction and arrangement of the parts may be made without departing from my invention, as defined in the appended claims.

I claim:—

1. A stock handling and stock storage yard having a loading track, means for loading charging boxes located on cars placed on said track, said means being arranged to separately handle metallic and non-metallic materials loaded into the charging boxes, and means beneath the cars and charging boxes thereon arranged to collect the materials spilled during the loading operations in a heap in position to be again handled in quantities in removing the materials in the heap.

2. A stock handling and stock storage yard having a loading track arranged to hold carriers while the carriers are being filled, and means for handling materials in filling the carriers, said means being arranged to handle metallic portions of the materials independently of the non-metallic portions.

3. A stock handling and stock storage yard having a crane runway, a traveling crane operatively mounted upon the runway, a car track within range of said crane and a recovery pit beneath said car track arranged to receive and collect into position for removal therefrom the materials spilled in loading and unloading cars on said track, said crane having means adapted to operate and independently remove metallic portions of the spilled materials from the pit.

4. A stock handling and stock storage yard having a crane runway, a crane operatively mounted upon the runway, a car track within range of said crane and a recovery pit beneath said car track arranged to receive and assemble into position for removal therefrom materials spilled in loading and unloading cars on said track, said pit being arranged to permit removal of materials collected therein by said crane.

5. A stock handling and stock storage yard having car loading and unloading tracks, means for loading and unloading cars placed on said tracks, and a recovery pit beneath said tracks, said pit being constructed and arranged to receive and collect into position for removal therefrom the materials spilled by the car loading and unloading means in loading and unloading cars on said tracks, said loading and unloading means being adapted to separate and independently remove metallic portions of the spilled materials from the pit.

6. A stock handling and stock storage yard having a car track, means for loading and unloading cars placed on said tracks, means beneath said tracks arranged to receive materials spilled in loading and unloading the cars, said receiving means being adapted to assemble the spilled materials in position to be removed therefrom by the car loading and unloading means, the unloading means being adapted to separate and independently remove the magnetic and non-magnetic materials collected beneath the track.

7. A stock handling and stock storage yard having a car track, means for loading and unloading cars placed on said track, means beneath said track arranged to receive materials spilled in loading and unloading the cars, said receiving means being adapted to assemble the spilled materials in position to be removed therefrom by the car loading and unloading means, the unloading means being arranged to separate and remove the magnetic materials collected beneath said track from the non-magnetic materials.

In testimony whereof, I have hereunto set my hand.

MAX M. SUPPES.

Witnesses:
F. W. WATERMAN,
D. W. LAWRENCE.

Copies of this patent may be obtained for five cents each, by addressing the "Commissioner of Patents, Washington, D. C."